Dec. 1, 1959  S. B. DISSON ET AL  2,915,702

PULSE DURATION INDICATOR

Filed Nov. 22, 1955

INVENTORS
STANLEY B. DISSON
PAUL WINSOR III

BY

*George Baron*

ATTORNEY

United States Patent Office 2,915,702
Patented Dec. 1, 1959

2,915,702

PULSE DURATION INDICATOR

Stanley B. Disson, Broomall, and Paul Winsor III, Wayne, Pa., assignors to Burroughs Corporation, Detroit, Mich., a corporation of Michigan Application November 22, 1955, Serial No. 548,397

5 Claims. (Cl. 324—68)

This invention relates to bistable magnetic devices in general and more particularly to the employment of a bistable magnetic device as an element in an electrical measuring circuit.

Bistable magnetic elements, normally in the shape of cores and having substantially square hysteresis loop characteristics, having been described in articles such as that entitled "Magnetic Triggers" published in the June 1950 issue of the Proceedings of the I.R.E. by An Wang. Binary electrical signals are carried by a winding associated with such a bistable magnetic core so that the winding converts such signals to a magnetic flux. Such magnetic flux is employed to change the magnetic remanence condition of the core. The core is composed of a magnetic material having the property of low coercive force and high residual magnetism. Such a core may be readily magnetized in one direction of magnetic remanence called its "one" state, or in another direction of opposite polarity to its other remanent state, called its "zero" state. A core fabricated of magnetic material of the type disclosed in the An Wang article and having the property of low coercive force and high residual magnetism may be placed in one of these two states of remanence by means of windings on or associated with the core to which are applied signal pulses, and the particular state existing within a core may be determined by a voltage pulse induced in other windings on the core when the flux state of the core is reversed.

The instant invention utilizes the aforementioned characteristics of a bistable magnetic core as a means for measuring the duration of a signal pulse. Because of the reliability of operation of a magnetic core, as well as its ruggedness and simplicity, it is a very useful element in a testing circuit. The core of this invention is wound with three windings; one is called the signal or input winding, the second is the interrogating or test winding, and the third is the output or result winding. A signal pulse, whose duration is to be measured, is carried by the input winding. The input winding is wound about or associated with the bistable magnetic core in such a manner as to cause the core to be switched toward its positive remanent or "one" state. For the duration of the signal pulse, the bistable magnetic core is maintained in its saturated positive condition.

The interrogating or test winding is fed with constant amplitude pulses that appear at a fixed, controllable rate. These pulses, often called "clock pulses" because of their uniform repetitive occurrence, supply more flux energy than the signal pulses to the bistable core so that the clock pulses override the effect of the signal pulses on such core. Consequently each clock pulse will drive the core to its negative remanent or "zero" state, and such reversal of polarity of the core will create an output signal pulse in the output or result winding on the core. When the clock pulse terminates, the signal pulse prevails, so the state of the core is reversed toward its positive magnetic state. Such reversal of the state of the core produces an output pulse in the output winding, but such output pulse, because of the orientation of a diode in the output circuit that includes the output winding, is not sensed in the output circuit. When the next clock pulse appears it overrides the magnetic bias of the signal pulse, and the cycle begins anew.

The output pulses obtained when the core is switched from its positive remanent condition to its negative remanent condition are used to charge a condenser and the average leaking off the condenser is read on a D.-C. ammeter. The average current is a measure of the duration of the signal pulse. For when the signal pulse terminates, the core is no longer biased toward its positive magnetic state. Consequently the periodic clock pulses will set the core to its "zero" state and further clock pulses will have no effect on switching the core because they will be tending to switch a core to a "zero" state that is already in a "zero" state.

Therefore it is an object of this invention to obtain a pulse duration indicator utilizing a bistable magnetic core in the measuring circuit. It is a further object to convert the periodic outputs of a magnetic core into a D.-C. output so that one may more readily measure the duration of a signal pulse.

It is yet another object to simplify the measuring of durations of pulses by employing few elements yet retain reliability of operation.

These and further objects of the invention, both as to its organization and method of operation, will best be understood from the following description when read in connection with the accompanying drawings in which Figure 1 is an embodiment of the invention shown in electric schematic form;

Figure 1:
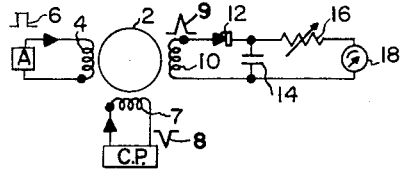
Figure 2:
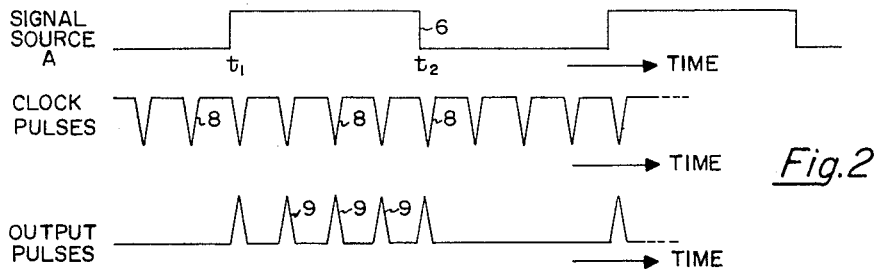
Figure 2 is a pulse-time diagram of the pulse signals utilized in the embodiment of the invention shown in Figure 1.
Figure 4:
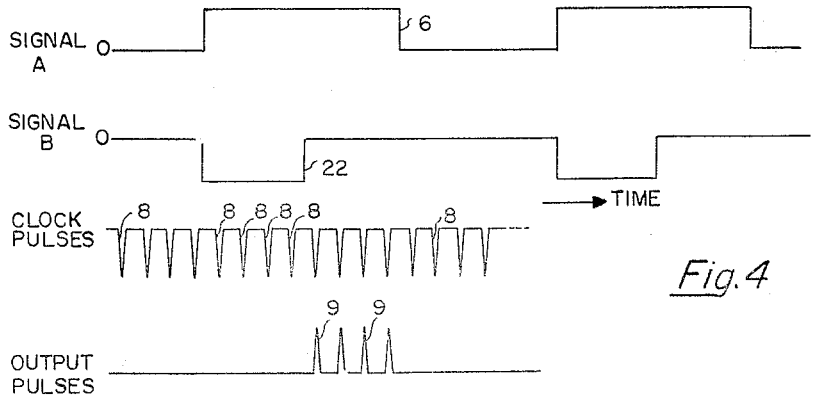
Figure 4 is a pulse-time diagram of the pulse signals employed in the invention of Figure 3.

In Figure 1 there is shown a bistable magnetic core 2 and winding 4, the input winding, coupled to the core 2 and adapted to carry a positive signal pulse 6 (see Figure 2) from source A whose duration it is desired to measure. This signal pulse 6 causes conventional current to enter the undotted terminal of winding 4 for biasing the bistable core 2 toward its "one" state. Signal pulse 6 is of sufficient amplitude to switch core 2 toward its "one" state and upon termination of said signal pulse 6, core 2 would remain in its "one" state if there were no other magnetic fields to influence the core 2.

It is understood that non-square cores, that is, cores whose B–H hysteresis loops have a value less than 0.9, can be used so long as signal pulse 6 is of sufficient amplitude to overcome the coercivity of core 2. Although cores having square hysteresis characteristics are preferred because less noise is produced in output circuits associated with such square cores, the invention is not necessarily limited to such "square" cores.

However periodic clock pulses, such as negative voltage pulses 8, cause conventional current to enter winding 7 through the dotted terminal of such winding. These voltage pulses have sufficient amplitude not only to switch core 2 toward its "zero" state, but to override the effect of signal pulse 6 and actually switch the core 2 toward its "zero" state. Such actual switching of core 2 produces an output in output winding 10. Consequently every time that a clock pulse 8 appears between $t_1$ and $t_2$, the duration to be determined, an output pulse 9 appears in winding 10. As soon as the clock pulse 8 terminates, the signal pulse 6 reswitches the core 2 to its "one" state. The appearance of the next clock pulse 8 again overrides the influence of signal pulse 6 and switches core 2 toward its "zero" state. The stream of output voltage pulses 9 appearing between $t_1$ and $t_2$ and corresponding to the duration of signal pulse 6 traverse diode 12 and charge capacitor 14. Capacitor 14 discharges through resistor 16 to produce an average current through ammeter 18 or a similar current measuring device, such as a pulse counter that converts a numerical value into a linear value. This average current can be calibrated in units of time to give an indication of the duration of signal pulse 6.

It is noted that the termination of the signal pulse 6 also terminates the production of output pulses 9 because the repeated appearance of a clock pulse 8 after the termination of signal pulse 6 will serve only to drive a core, already in its "zero" state, toward its "zero" state, and thus fail to produce an output pulse 9. It is also noted that when a clock pulse 8 terminates during the period $t_1$—$t_2$, the persisting signal pulse 6 will prevail to switch core 2 from its "zero" state (produced by clock pulse 8) to its "one" state to produce an output pulse in winding 10. Such an output pulse would have a polarity opposite to that of output pulse 9. Consequently diode 12 will effectively block such undesired output pulse so that capacitor 14 is not given a charge opposite to that produced by output pulses 9.

Moreover, when a "square" core 2 is used, namely, one that has a substantially square or rectangular B–H hysteresis loop, the measuring circuit is independent of the amplitude of pulse signal 6. As long as the signal pulse 6 reaches that minimum amplitude necessary to switch core 2 to a given state and maintain it there, the measuring circuit will operate. Greater amplitudes of pulse signals 6 will not vary the operation of the instant measuring device. Consequently the amplitudes of signal pulses 6 may vary considerably yet not interfere with the measurement of the durations of such signal pulses 6.

Figure 3:
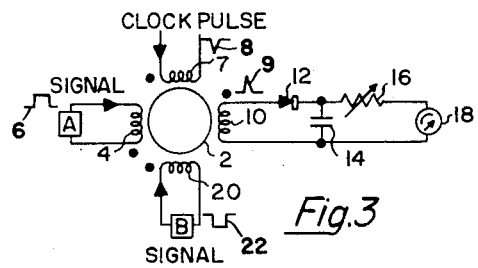
Figure 3 is a modification of the embodiment shown in Figure 1.

Figure 3 shows the invention as it is applied towards the comparison of the durations of two independent signal pulses. Figure 3 is substantially that of Figure 1 except that another source B of negative signal pulses 22 is carried by an additional input winding 20. Pulse signals from sources A and B, such as positive signal pulses 6 and negative signal pulses 22, are applied to respective input windings 4 and 20. The pulses are of the same amplitude and occur substantially simultaneously. Negative signal pulse 22 causes conventional current to enter the dotted terminal of winding 20 so that its presence nullifies or inhibits the influence of positive pulse 6 that is applied to the undotted terminal of winding 4. Negative clock pulses 8 that are applied to winding 7 cause conventional current to enter the dotted terminal of the winding 7 during the presence of negative pulse 22 and will have no effect on core 2 because core 2 will be in its "zero" state because of the presence of signal pulse 22. However as soon as signal pulse 22 has terminated, the appearances of clock pulses 8 during the presence only of pulse signal 6 will produce output pulses 9. These output pulses 9 will charge capacitor 14, and the discharge of capacitor 14 through resistor 16 will be read on meter 18 to give an indication of the difference in pulse widths of two separate pulse signals.

Figure 5:
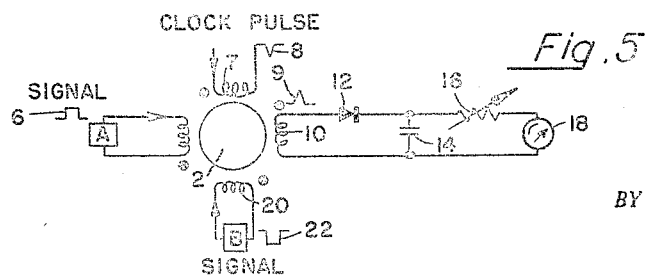

If desired, the invention of Figure 3 can be readily modified to indicate the duration of overlap between signals A and B rather than the difference in duration. Such a circuit is shown in Fig. 5. The indication of overlap is attained by having windings 4 and 20 wound in the same manner about magnetic core 2 so that signals 6 and 22 will magnetize core 2 in the same direction when they are carried by windings 4 and 20. The ampere turns of windings 4 and 20 are such that only when both signals 6 and 22 are present simultaneously will the coercive force of the core 2 be overcome and be switched. The appearance of clock pulses 8 during this overlap would repeatedly reswitch core 2 so as to produce an indication or output pulses 9, said output pulses 9 serving to charge capacitor 14 in the manner hereinbefore described. The reading on meter 18 would be an indication of overlap of pulses 6 and 22.

A practical application of the instant invention is found in conventional teletype signalling. In teletype communication, it is desirable to control the ratio of the interval when marks are transmitted by the teletyper and the interval when spaces between marks are transmitted. This ratio, called the mark/space bias should ideally approach 1. A system as described herein can be employed to measure the duration of either the marking interval or the space interval and compare such measured duration with a standard interval. Thus the instant invention would monitor and could be coupled to a control system to reset the parameters of a teletype transmitter so as to keep the transmitter operating within close tolerances.

In an actual operation of the instant invention, the resistor 16 and capacitor 14 are chosen to have a relatively long time constant as compared to the duration of each signal pulse 6 or 22. A signal pulse 6 or 22 is of the order of milliseconds, roughly about 22 milliseconds. The clock pulses have a duration of microseconds. The time constant of the output circuit must be long enough so as to integrate the output pulses 9 as a steady state phenomenon. This time constant as well as the time constant of meter 18 is of the order of seconds, so the signal pulses whose durations are to be measured must be repetitively applied to bistable core 2 until the meter reaches its steady state reading.

Thus it is seen that the invention provides a relatively simple yet reliable means for determining pulse duration utilizing the inherent properties of a bistable magnetic core in an unusual and novel manner. Moreover, since the aforedescribed invention converts discrete output pulses occurring as a consequence of the presence of clock pulses into a meter or indicator reading, it operates as a digital-analog converter and can be adapted for use in digital-analog computing devices.

What is claimed is:

1. A pulse-width measuring circuit comprising a magnetic element capable of assuming either of two stable states of magnetic remanence; first input winding means coupled to said magnetic element for applying thereto spaced-apart pulses whose width is to be measured, each of said pulses being of a magnitude and polarity to switch said element to one of its two stable states and to tend to maintain said element in said one stable state for the duration of the pulse; second input winding means coupled to said magnetic element for applying thereto, concurrently with said first-means pulses, a series of relatively short pulses of known fixed repetition rate, said series continuing at least throughout the duration of the first-means pulses whose width is to be measured, each of said second-means pulses being of a polarity and magnitude to apply sufficient magnetizing force to said element to override the magnetizing effect of the first-means pulse and to switch said element to its other stable state in response to each such second-means pulse, said element being switched back to its said one stable state by the continuing first-means pulse during each interval between said second-means pulses; output winding means coupled to said magnetic element in which is induced a series of discrete voltage output pulses in response to the repeated switchings of said magnetic element from its one to its other stable state; and averaging means for converting said voltage output pulses to an average signal indicative of the pulse width of the individual first-means pulses.

2. A pulse-width indicating circuit comprising a magnetic element capable of assuming either of two stable states of magnetic remanence; first input winding means coupled to said magnetic element for applying thereto a first signal pulse of a magnitude and polarity to exert a magnetizing force tending to switch said element to one of its two stable states and tending to maintain said element in said one stable state for the duration of the applied pulse; second input winding means coupled to said magnetic element for applying thereto, concurrently with said first signal pulse, a second signal pulse of a magnitude and polarity to oppose and substantially cancel the magnetizing force of said first signal pulse; third input winding means coupled to said magnetic element for applying thereto a series of relatively short sampling pulses of fixed repetition rate such that a substantial number of sampling pulses are applied during each of said first or second signal pulses, each of said sampling pulses being of a polarity to exert a magnetizing force which is the same as that of said second signal pulse and opposite that of said first, the magnitude of the magnetizing force exerted by said sampling pulse being sufficient to override the magnetizing force of said first signal pulse alone, whereby, following termination of said second signal pulse and continuation of said first, said element is switched to the other of its stable states by said sampling pulse and is switched back to its one stable state by the continuing first signal pulse; output winding means coupled to said magnetic element in which is induced a series of discrete voltage output pulses in response to the repeated switchings of said magnetic element from its said one to its other stable state; and averaging means for converting said voltage output pulses to an average signal indicative of the extent to which the duration of said first signal pulse exceeded that of said second.

3. A pulse-width indicating circuit comprising a magnetic element capable of assuming either of two stable states of magnetic remanence; first input winding means coupled to said magnetic element for applying thereto a first signal pulse of a magnitude and polarity to exert a magnetizing force tending to switch said element to one of its two stable states and tending to maintain said element in said one stable state for the duration of the pulse; second input winding means coupled to said magnetic element for applying thereto, concurrently with said first signal pulse, a second signal pulse of a magnitude and polarity to oppose and substantially cancel the magnetizing force of said first signal pulse; third input winding means coupled to said magnetic element for applying thereto a series of relatively short sampling pulses of fixed repetition rate such that a substantial number of sampling pulses are applied during each of said first or second signal pulses, each of said sampling pulses being of a polarity to exert a magnetizing force which is the same as that of one of said signal pulses and opposite that of the other, the magnitude of magnetizing force exerted by said sampling pulse being sufficient to override the magnetizing force of said other signal pulse alone, whereby, following termination of said one signal pulse and continuation of said other, said element is switched to the other of its stable states by said sampling pulse and is switched back to its one stable state by the said continuing other signal pulse; output winding means coupled to said magnetic element in which is induced a series of discrete voltage output pulses in response to the repeated switchings of said magnetic element from its said one to its other stable state; and averaging means for converting said voltage output pulses to an average signal indicative of the extent to which the duration of said other signal pulse exceeded that of said one signal pulse.

4. A pulse-width indicating circuit comprising a magnetic element capable of assuming either of two stable states of magnetic remanence; first input winding means coupled to said magnetic element for applying thereto a first signal pulse; second input winding means coupled to said magnetic element for applying a second signal pulse thereto concurrently with said first signal pulse, said first and second signal pulses exerting additive magnetizing forces on said element, the magnitude of the force exerted by either said first or second signal pulse alone being insufficient to switch said element, the combined magnetizing forces of the first and second signal pulses being sufficient to switch said element to one of its two stable states and to tend to maintain said element in said one stable state for the concurrent duration of both pulses; third input winding means coupled to said magnetic element for applying thereto a series of relatively short sampling pulses of fixed repetition rate such that a substantial number of sampling pulses are applied during each of said first or second signal pulses, each of said sampling pulses being of a polarity to exert a magnetizing force which is opposite that of said first and second signal pulses, the magnitude of the magnetizing force exerted by said sampling pulse being sufficient to override the combined magnetizing force of said first and second signal pulses, whereby, during the concurrent continuance of both said first and second signal pulses, said element is switched to its other stable state by said sampling pulse and is switched back to its one stable state by the said concurrent continuation of both said first and second signal pulses, but whereby, following termination of either one of said first or second signal pulses, said element remains in said other stable state to which it is switched by said sampling pulse; output winding means coupled to said magnetic element in which is induced a series of discrete voltage output pulses in response to the repeated switchings of said magnetic element from one to the other of its stable states; and averaging means for converting said voltage output pulses to an average signal indicative of the duration of the period during which both said first and second signal pulses existed concurrently.

5. A pulse-width indicating circuit comprising a magnetic element capable of assuming either of two stable states of magnetic remanence; first input winding means coupled to said magnetic element for applying thereto spaced-apart signal pulses, said signal pulses being adapted to apply a magnetizing force to switch said element to one of its two stable states and to tend to maintain said element in said one stable state; second input winding means coupled to said magnetic element for applying thereto, concurrently with said signal pulses, a series of relatively short sampling pulses of fixed repetition rate, said series of sampling pulses continuing at least throughout the duration of said signal pulses, each of said sampling pulses being of a polarity and magnitude to apply sufficient magnetizing force to said element to override the magnetizing force of said signal pulses and to switch said element to its other stable state in response to such sampling pulse, said element being switched back to its said one stable state by said signal pulse during the interval between said sampling pulses and during the continuation of said signal pulses; output means coupled to said magnetic element in which is induced a series of discrete voltage output pulses in response to the repeated switchings of said magnetic element from one to its other stable state; and averaging means for converting said voltage output pulses to an average signal indicative of the pulse width of said signal pulses.

References Cited in the file of this patent

UNITED STATES PATENTS

| | | |
|---|---|---|
| 2,653,254 | Spitzer | Sept. 22, 1953 |
| 2,772,357 | An Wang | Nov. 27, 1956 |
| 2,777,098 | Duffing et al. | Jan. 8, 1957 |
| 2,786,147 | Kaufmann | Mar. 19, 1957 |